(12) United States Patent
Smith et al.

(10) Patent No.: US 7,715,516 B2
(45) Date of Patent: May 11, 2010

(54) METHOD OF DELIVERING A TOOL INTO A SUBMERGED BORE

(75) Inventors: Jarred Smith, Huntersville, NC (US); Jack Matsumoto, Sunnyvale, CA (US); Christopher M Welsh, Livermore, CA (US); Trevor J Davis, Charlotte, NC (US)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 11/103,931

(22) Filed: Apr. 12, 2005

(65) Prior Publication Data

US 2006/0227921 A1    Oct. 12, 2006

(51) Int. Cl.
*G21C 17/00* (2006.01)

(52) U.S. Cl. .................. 376/149; 376/248; 376/260

(58) Field of Classification Search .............. 376/245, 376/252, 248, 259, 258, 260, 348, 349; 73/40.5 R, 73/40.5 A; 324/222; 294/86.13, 86.12
See application file for complete search history.

(56) References Cited

U.S. PATENT DOCUMENTS

| | | | |
|---|---|---|---|
| 3,636,778 A | 1/1972 | Huffstetler | |
| 3,862,578 A | 1/1975 | Schluter | |
| 4,050,384 A | 9/1977 | Chapman | |
| 4,304,134 A | 12/1981 | Rouse et al. | |
| 4,581,927 A | 4/1986 | Johnson | |
| 4,820,982 A | 4/1989 | Aubert | |
| 4,843,896 A | 7/1989 | Napeloni et al. | |
| 4,876,506 A | 10/1989 | Brown et al. | |
| 5,025,215 A | 6/1991 | Pirl | |
| 5,028,381 A | 7/1991 | Dugue | |
| 5,068,721 A * | 11/1991 | Dietrich | .................. 348/83 |
| 5,105,881 A | 4/1992 | Thoms et al. | |
| 5,156,803 A | 10/1992 | Engding et al. | |
| 5,174,165 A | 12/1992 | Pirl | |
| 5,195,392 A | 3/1993 | Moore et al. | |
| 5,205,174 A * | 4/1993 | Silverman et al. | ............. 73/623 |
| 5,520,245 A | 5/1996 | Estes | |
| 5,561,883 A * | 10/1996 | Landry et al. | ................. 15/302 |
| 5,565,633 A | 10/1996 | Wernicke | |
| 5,586,155 A | 12/1996 | Erbes et al. | |
| 5,760,306 A | 6/1998 | Wyatt, III et al. | |
| 5,787,137 A | 7/1998 | Nelson, III et al. | |
| 5,878,099 A | 3/1999 | Burrows et al. | |
| 5,982,839 A | 11/1999 | Hatley | |

(Continued)

OTHER PUBLICATIONS

Roman. "Robots Cut Risks and Costs in Nuclear Power Plants." IEEE Computer Applications in Power. Jul. 1991. pp. 11-15.*

(Continued)

*Primary Examiner*—Johannes P Mondt
(74) *Attorney, Agent, or Firm*—Harness, Dickey & Pierce, P.L.C.

(57) ABSTRACT

A method for delivery of a tool into a submerged bore includes controlling the movement of a tool delivery device in the pool by operating at least one propulsion drive located on the tool delivery device. The tool delivery device is coupled to an inlet to the bore and a tool is inserted from the tool delivery device through the inlet and into the bore.

15 Claims, 5 Drawing Sheets

U.S. PATENT DOCUMENTS

| | | | |
|---|---|---|---|
| 6,076,407 | A | 6/2000 | Levesque et al. |
| 6,104,970 | A * | 8/2000 | Schmidt et al. ............... 701/2 |
| 6,169,776 | B1 | 1/2001 | Collins |
| 6,425,340 | B1 * | 7/2002 | McGuire ................... 114/222 |
| 6,526,114 | B2 | 2/2003 | Paillaman et al. |
| 6,536,283 | B1 * | 3/2003 | Hatley ........................ 73/622 |
| 6,595,152 | B2 * | 7/2003 | McGuire ................... 114/222 |

OTHER PUBLICATIONS

Ikegami et al. "Plant Life Management and Maintenance Technologies." Hitachi Review vol. 50 (2001), No. 3. and "Hitachi: Inspire the Next" addendum. <www.hitachi.us/supportingdocs/forbus/powerindustrial/nuclearpower/ROV.pdf> downloaded Nov. 6, 2006.*

Yuh. "Design and Control of Autonomous Underwater Robots: A Survey." Autonomous Robos 8, 7-24 (2000). pp. 7-24.*

Yuh. "Development in Underwater Robotics." IEEE International Conference on Robotics and Automation. 1995. pp. 1862-1867.*

Kimura et al., "Underwater Remote Handling Equipment for Reactor Internals Maintenance", Proceedings of ICONE10, 10$^{th}$ International Conference on Nuclear Engineering, Arlington, VA Apr. 14-18, 2002 (© ASME).*

* cited by examiner

METHOD OF DELIVERING A TOOL INTO A SUBMERGED BORE

CROSS-REFERENCE TO RELATED APPLICATIONS

This application is related to U.S. application Ser. No. 11/104,583, filed on Apr. 12, 2005, which issued as U.S. Pat. No. 7,512,207 on Mar. 31, 2009, coincidental with the present application.

FIELD OF THE INVENTION

This invention relates generally to a method of delivering a tool into a submerged bore, and more particularly to a method for delivering an inspection tool for examining a submerged nuclear reactor jet pump.

BACKGROUND OF THE INVENTION

Bores such as pipes or cylindrically shaped equipment are often submerged in a pool of water or other liquid. There is often a need to have a maintenance tool or inspection probe delivered into the submerged bore. For example, a reactor pressure vessel (RPV) of a boiling water reactor (BWR) typically has submerged bores that need to be inspected during maintenance routines. Hollow tubular jet pumps having internal bores are positioned within an annulus to provide the required reactor core water flow. The jet pump includes an upper portion, known as the inlet mixer, and a lower portion, known as the diffuser. The inlet mixer and the diffuser, due to their large size, are formed by welding a plurality of cylindrical and conical sections together. Specifically, respective ends of adjacent cylindrical sections are joined with a circumferential weld. During operation of the reactor, the circumferential weld joints may experience inter-granular stress corrosion cracking (IGSCC) and irradiation assisted stress corrosion cracking (IASCC) in weld heat affected zones which can diminish the structural integrity of the jet pump.

It is important to examine the welds of the jet pump inlet mixer and diffuser periodically to determine whether any cracking has occurred. While examinations in the annulus or region between a shroud and a pressure vessel wall can be performed, these examinations are likely to be only partial inspections due to access limitations in the annular region of the reactor. As such, the examination of the jet pump welds are often examined by an inspection tool positioned inside of the jet pump inlet mixer and jet pump diffuser. Such inspection tool performs ultrasonic and/or eddy current examinations of jet pump welds from inside the jet pump inlet mixer and diffuser in a nuclear reactor.

Typically, operational personnel located on a refuel bridge above the surface of the pool manipulate poles and other mechanical suspension devices to position a funnel to the inlet mixer of each jet pump to be inspected. For a single BWR, there can be up to 20 jet pumps and therefore 20 funnels must be attached and/or relocated during the operation. Once a funnel is positioned at the inlet of a jet pump inlet, the funnel is clamped to the inlet using another handling pole. As the inlet to the jet pumps are submerged, often up to 50 feet under the surface of the pool, the manual manipulation of these poles and the funnel is difficult and time consuming. After a funnel is attached to a jet pump inlet, a mechanical tool delivery device is placed in the pool. Typically, the tool delivery system is placed into the pool using an overhead crane and is then transferred to a monorail hoist on the refuel bridge. The tool delivery system is then lowered onto a head stud or top flange at the top of the open reactor pressure vessel RPV. The tool delivery system is placed between two adjacent jet pumps such that the position can be used to inspect both without having to move the tool delivery system. The tool delivery system is connected to the funnel with a locating cone and requires that one of the operators mate the cone, which is attached to a flexible arm on the lower portion of the tool delivery system, with the funnel. The arm must be manually manipulated by the operator from the refuel bridge using a rope to lower the tool delivery system until the cone is mated with the funnel.

After the tool delivery system is mated with the funnel, the inspection tool or probe is inserted into each of the funnel and the jet pump inlets to perform the inspection of the inside of the jet pump assembly. Once the first adjacent jet pump is inspected, the tool delivery system is disconnected from the first funnel and moved to the second funnel and the attachment, insertion, and inspection operations are repeated. The tool delivery system must be detached from the head stud or top flange for the first two jet pumps and manually moved to a position that is between two other jet pumps to be inspected. This manual process is repeated until all jet pumps have been inspected. Often the operator will utilize at least one submerged camera to aid in the movement, manipulation, attachment, and detachment of the submerged components.

In other systems and methods, a probe driver assembly can be located at the upper-most level of the probe outside of the jet pump diffuser. Such a probe driver assembly provides for axial movement of the inserted probe by using a take-up reel and a set of pinch wheels to raise and lower the probe head. However, such systems are difficult to position and require considerable operator involvement and still require manual placement on each jet pump.

As such, all of the current systems and methods require manual manipulation by poles to attach, move and operate submerged tools. These processes often require more than one operator. As such, current systems and methods for inspecting the inside of a submerged bore such as a nuclear reactor jet pump that can be submerged 50 feet below the surface of a water pool are difficult, time consuming, and costly. Often such tasks become a critical path item during a nuclear reactor reloading process. As such, any opportunity for reducing the required time can decrease the amount of off-line or down-time of the reactor and therefore provide significant cost savings to the reactor operator.

SUMMARY OF THE INVENTION

The inventors hereof have succeeded at designing a method for remotely positioning, inserting, and operating a tool within a submerged bore. This includes positioning, inserting, and operating an inspection tool within a jet pump of a nuclear reactor. The various embodiments of the invention provide for an improved method and system of inspecting submerged bores such as jet pumps which can provide for fewer operating personnel to perform the tool delivery and can provide decreased costs and reduced time requirements.

According to one aspect of the invention, a method for delivery of a tool into a submerged bore includes generating a video signal from a tool delivery device submerged in a pool and controlling the movement of the tool delivery device within the pool by operating at least one propulsion drive located on the tool delivery device. A tool delivery device is coupled to an inlet to the bore and a tool is inserted from the tool delivery device through the inlet and into the bore. The position of the tool in the bore is controlled, the tool is withdrawn from the inlet and the bore, and the tool delivery device is decoupled from the inlet.

According to another aspect of the invention, a method for inspecting the inside of a nuclear reactor jet pump submerged in a reactor pool includes controlling the movement of an inspection probe delivery device in the pool by operating at least one propulsion drive located on the inspection probe delivery device. The inspection probe delivery device is coupled to an inlet to the jet pump and an inspection probe is inserted from the tool delivery device through the inlet and into the jet pump.

According to yet another aspect of the invention, a method for delivery of a tool into a nuclear reactor jet pump submerged in a reactor pool includes receiving a plurality of commands over a communication facility and controlling the movement of a tool delivery device in the pool. The movement is controlled by operating at least one propulsion drive located on the tool delivery device. The tool delivery device is coupled to an inlet to the jet pump and a tool from the tool delivery device is inserted through the inlet and into the jet pump. The controlling, coupling and inserting are each responsive to at least one of the received commands.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

Like reference symbols indicate like elements or features throughout the drawings.

DETAILED DESCRIPTION OF EXEMPLARY EMBODIMENTS

The following description is merely exemplary in nature and is in no way intended to limit the invention, its applications, or uses.

Figure 1:
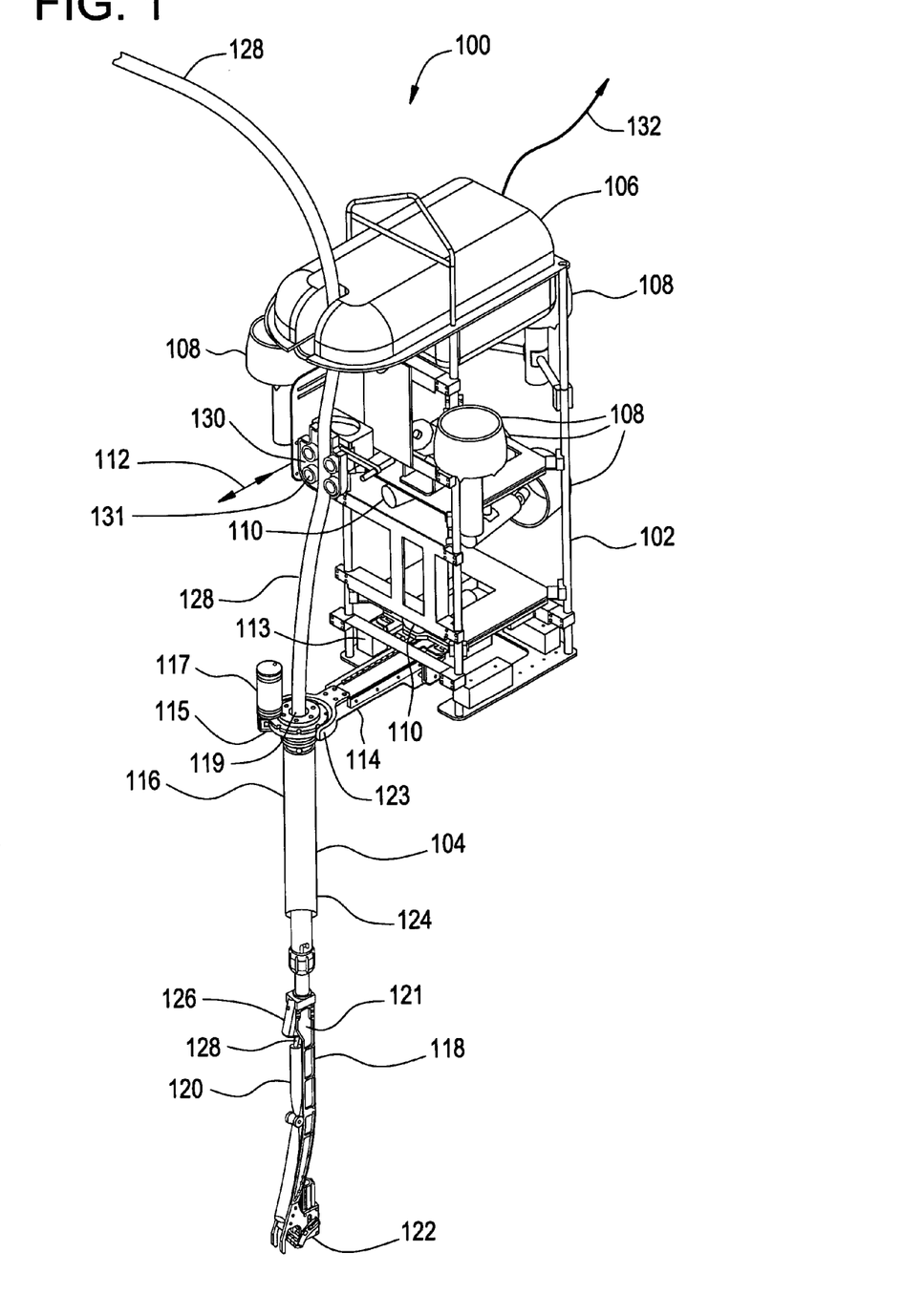
FIG. 1 is a perspective side view of a tool delivery device according to one exemplary embodiment of the invention.

Referring to FIG. 1, one exemplary embodiment of an inspection delivery tool, a tool delivery device 100. The tool delivery device 100 includes a submarine assembly 102 and a guide assembly 104. The submarine assembly 102 includes a floatation assembly 106 for providing an upward lift to the tool delivery device while operating in a pool of liquid such as water. The floatation assembly 106 can include one or more ballast chambers or floatation components (not shown) such as an air tank or a floatation material. The floatation assembly 106 can be passive such as with floatation material or an air tank, or can be active, and include an adjustable bladder or similar device to provide a variable ballast upward lift to the tool delivery device 100. One or more thrusters or propulsion drives 108 are remotely controlled to propel the tool delivery device 100 in three-dimensions within the pool. The thrusters 108 can be any type of propulsion drive capable of propelling the tool delivery device 100 in at least one direction within the liquid. By way of example, the thruster 108 can be motor or air driven propeller. In FIG. 1, three thrusters 108 provide for vertical movement of the tool delivery device 100 and two thrusters 108 provide for lateral movement. Other thrusters 108 can also be provided. More or less thrusters 108 of one or more types can be provided in other embodiments and still be within the scope of the present invention.

In some embodiments, one or more video cameras 110 are positioned on the submarine assembly 102. FIG. 1 illustrates two such cameras by way of example. A video signal is generated by each video camera 110 and transmitted from the submarine assembly 102 to a remotely located video display via a communication interface 112. The video cameras 110 are positioned to provide a video image of the submarine assembly 102, the guide assembly 104, and any object or surface located within video imaging range of the video cameras 110. The video cameras 110 can be any type of video imaging device and can include one with very low lux density requirements. Also, one or more lights (not shown) can be provided on the submarine assembly 102 and positioned to illuminate objects within the view of one of the video cameras 110.

In another embodiment, a position locator (not shown) can be included on the submarine assembly 102. Where provided, the position locator can inter-work with a position system for providing a position signal that indicates the position of the submarine assembly 102 within a pre-defined coordinate system that includes the pool and one or more bores submerged in the pool. In yet other embodiments, the submarine assembly 102 can include other types of position sensors including, only by way of example, distance detectors, laser detectors, microwave detectors, sonic detectors, infrared detectors, and magnetic detectors. When provided in various embodiments, such position sensors can transmit a position signal to a remote user or remote operational system or device to aid in moving, positioning, and controlling the tool delivery device 100.

The guide assembly 104 is coupled to the submarine assembly 102 in a manner to enable engagement or placement of a tool within a submerged bore through the movement of the submarine assembly 102. In one embodiment, the submarine assembly 102 includes an adjustable linear coupling 114 to couple to the guide assembly 104. The adjustable linear coupling 114 provides for a variable and controllable distance between the submarine assembly 102 and the guide assembly 104. The adjustable linear coupling 114 can include a motor 113 or actuator for adjusting the coupling distance in response to received commands such as by way of a signal, energy, or actuating force. In some embodiments, the guide assembly 104 can also be coupled to the submarine assembly 102 with an adjustable rotary coupling 115. The rotary coupling 115 can include a motor 117 or actuator for rotating the guide assembly 104 about an axis.

The guide assembly 104 can be of any shape or form, but is shown in FIG. 1 as a tool guide 116 that is hollow and has a first end with a top opening 119 or port attached to the submarine assembly 102 via the adjustable linear coupling 114 and a second end having a bore insertion assembly 118. The bore insertion assembly 118 provides coupling to or positioning of the guide assembly 104 to a submerged bore and can also provide for holding a tool 120 in a non-deployed state. The guide assembly 104 can also include a telescoping or adjustable portion 124 along a length of the tool guide 116. Such adjustments are typically a mechanical adjustment made while the tool delivery device 100 is out of the pool. However, in some embodiments, the telescoping portion 124 could include a motor (not shown) that is remotely controllable.

As shown the bore insertion assembly 118 can include a guide latch 122 configured for coupling to a bore or an inlet to a bore in which a tool 120 is to be delivered. The guide latch 122 can include a clamping or engaging mechanism as will be discussed in further detail with regard to FIGS. 1 and 2. The bore insertion assembly 118 can be coupled to the other portions of the tool guide 116 by means of a flexible joint or gimbal 123. Such gimbal 123 may be located at any position along the length of guide A guide camera 126 or monitor or position sensor can also provide for remote viewing and positioning of the guide latch 122 to a bore or a bore inlet and therefore can aid in positioning of the tool delivery device 100 within the pool. Additionally, as noted above, a light (not shown) can also be provided to the bore insertion assembly 118 to aid in the operation of the system.

The tool 120 is shown positioned in guide assembly 104. The tool 120 includes a support umbilical 128 that can provide a variety of functions and capabilities by itself or in cooperation with an operator or portions of the submarine assembly 102. For instance, as shown in the exemplary embodiment of FIG. 1, the tool 120 is positioned in a first position in the tool guide 116 and within or above the guide latch 122. The umbilical 128 couples the tool 120 and is within the hollow core of the tool guide 116 and exits at top opening 119 where it is engaged by an umbilical or tool position controller 130. The tool position controller 130 can include, by way of example, one or more pinch rollers 131, for frictionally and compressively engaging umbilical 128. The tool position controller 130 engages the umbilical 128 to move the tool 120 down and up within the tool guide 116. As umbilical 128 has excess length beyond the submarine assembly 102, the tool position controller 130 can operate to extend or retract the length of umbilical 128 attached to the tool 120 and between the tool position controller 130 and the tool 120 thereby providing for the insertion and withdrawal of the tool 120 to and from a bore. The tool position controller 130 may be of any type or arrangement, but can include, by way of example, one or more motors, actuators, or biasing members, to support the engagement of the umbilical 128 for controlling the deployment of the umbilical 128.

The umbilical 128 can include a strength member, one or more electrical lines, communication lines, sensor lines, and/or one or more actuators lines (such as air or hydraulic pressure lines, by way of example). In some embodiments, all of the umbilical 128 is routed through the tool position controller 130 as is illustrated in FIG. 1. In other embodiments, only a portion of the umbilical 128 is routed through the tool position controller 130 and through tool guide 116.

Figure 3:
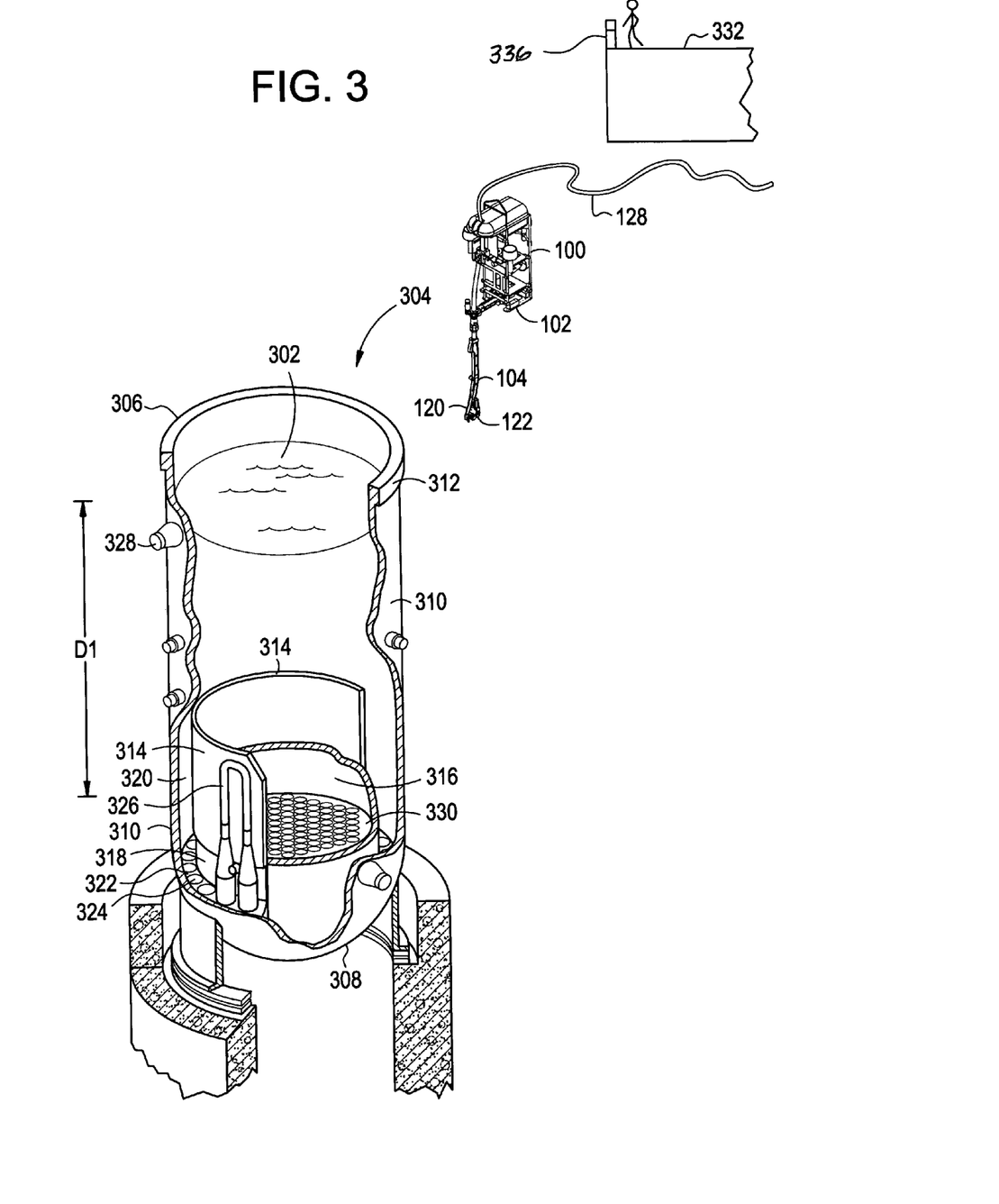
FIG. 3 is a sectional view, with parts cut away, of a partially disassembled and boiling water nuclear reactor pressure vessel containing a submerged jet pump bore according to one exemplary embodiment of the invention.

The tool delivery device 100 can also include one or more communication or control links 132 to interface with a tool delivery control module (shown in FIG. 3). The tool delivery control module can be one or more remote control units operated by an operator or it may be a computer system configured and operable to guide and operate one or more features or capabilities of the tool delivery device 100 and/or the tool 120.

Figure 2:
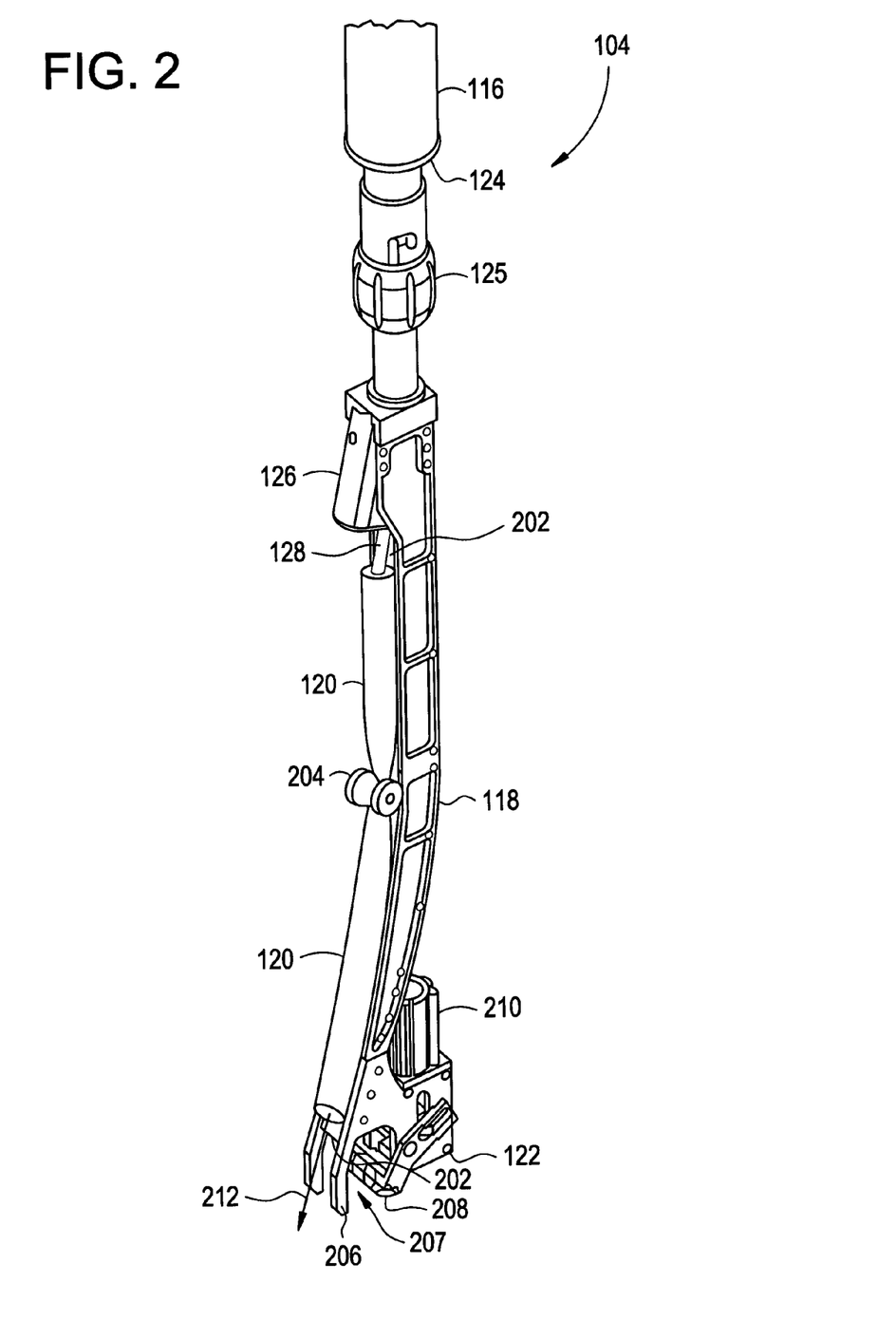
FIG. 2 is a side view of the lower portion of the tool delivery device configured with an exemplary inspection tool for delivery into a bore according to an exemplary embodiment of the invention.

Referring now to FIG. 2, a closer view of the guide assembly 104 illustrates, by way of example, the telescoping portion 124 attaching the bore insertion assembly 118 to the hollow portion of tool guide 116. A calibration collar 125 or standard unit for tool sensors can also be included for calibrating a sensor associated with the tool 120 while the tool delivery device 100 is submerged. As shown in FIG. 2, the tool 120 can include one or more sensor (not shown). During operation the tool 120 can be withdrawn into the bore of guide assembly 104 so as to position one or more sensors of the tool 120 to be positioned within calibration collar 125. In this manner, the sensors can be calibrated without having to withdraw the tool 120 or the tool delivery device 100 from the pool 302.

Also as shown, the guide camera 126 can be positioned to provide an image and image signal that includes the end of the bore insertion assembly 118 and a bore or any object located near the bore insertion assembly 118 or a guide latch 122. The tool 120 can be positioned in a tool guide channel 202 that can include a keeper or roller 204 to aid in keeping the tool 120 or the umbilical 128 within the tool guide channel 202. The guide latch 122 is located at the end of the bore insertion assembly 118 and includes one or more engagement members 206 and one or more opposing engagement members 208. A gap 207 is formed between engagement members 206 and 208. A latching actuator 210 engages one or both of the engagement members 206, 208 such that they move together and clamp an object or surface positioned within gap 207. In practice, engagement members 206, 208 and latching actuator 210 are dimensioned and arranged to couple to the bore, a lip of the bore, or an inlet to the bore, as required or desired for delivering the tool 120 into the submerged bore. For example, in one embodiment, the actuator is an air cylinder actuator that receives air pressure from an external source. When actuated, the air cylinder compresses opposing engagement member 208 towards engagement members 206 to clamp onto a lip or edge of a jet pump inlet positioned within gap 207. Once clamped onto the lip or edge, the bore insertion assembly 118 is positioned to insert the tool 120 into the bore along the insertion path 212 as indicated by the arrow.

In operation of some embodiments of a tool delivery device 100, a remotely located operator or operational system transmits control commands or similar control actions or signals to the tool delivery device 100 that has been placed within the pool or fluid. In response to the received commands, the tool delivery device 100 is moved within the pool by controlling the amount of thrust force applied to the liquid by the thrusters 108 and, when available, controlling the amount of ballast provided by the floatation assembly 106. The tool delivery device 100 is positioned with the help of position signals and/or a video image of the tool delivery device 100 and objects in the vicinity thereof. The operator or operational system moves the tool delivery device into a position such that the guide latch 122 is positioned to couple to the edge of a bore or an inlet. The thrusters 108, the adjustable linear coupling 114, and/or the rotary coupling 115 are controlled to position the guide latch 122 into a proper latching and tool insertion position. Once the guide latch 122 couples or clamps onto the bore or inlet, the tool delivery device 100 becomes partially fixed in position within the liquid. In such a case, the submarine assembly 102 can be maneuvered to be adjacent to a stable or fixed object if desired. The tool 120 is then inserted into the bore by deploying or retracting the umbilical 128 by controlling the tool position controller 130.

Once the tool 120 has been inserted as required, the tool position controller 130 withdraws the umbilical 128 and the tool 120 from the bore in response to received commands. The guide latch 122 is thereafter released from the bore or inlet and the tool delivery device 100 is moved to another bore as necessary.

As noted, the tool delivery device 100 and its various features can be dimensioned and configured for delivering a variety of tools to many different types of submerged bores. By way of one exemplary embodiment, referring to FIG. 3, the reactor 304 is filled with a pool 302 of liquid, such as water. The nuclear reactor 304 has one or more bores in which an inspection tool 120 is to be delivered. For clarity purposes only, FIG. 3 illustrates a sectional view, with parts cut away, of the boiling water nuclear reactor pressure vessel (RPV) 306. Typically, during operation the RPV 306 includes additional items including fuel and control rods and a cover. FIG. 3 illustrates the RPV 306 during a maintenance procedure such as a refuel procedure on the nuclear reactor. As such, some components have been removed and are not shown. However, this is a typical situation where an inspection tool 120 must be delivered to a submerged bore such as a jet pump for inspecting interior welds.

RPV 306 can have a generally cylindrical shape and is closed at one end by a bottom head 308 and at its other end by a removable top head (shown removed). A side wall 310 extends from bottom head to top. The side wall 310 includes a top flange 312 on which the top head (not shown) attaches. A cylindrically shaped core shroud 314 surrounds a reactor core 316. The shroud 314 is supported at one end by a shroud support 318 and includes a removable shroud head (not shown) at the other end. An annulus 320 is formed between shroud 314 and side wall 310. A pump deck 322, which has a ring shape, extends between shroud support 318 and the side wall 310. Pump deck 322 includes a plurality of circular openings 324; with each opening housing a jet pump assembly 326 (only one is shown in FIG. 3 for clarity purposes). Jet pump assemblies 326 are circumferentially distributed around core shroud.

In operation, heat is generated within core 316, which includes fuel bundles of fissionable material (not shown). Fuel bundles are aligned by a core plate 330 located at the base of core 316. Water circulated up through core 316 and core plate 330 and is at least partially converted to steam. The steam exits RPV 306 through a steam outlet 328 near top of the RPV 306.

As FIG. 3 illustrates the RPV 306 during a maintenance procedure, an operator can be positioned along a gangway, platform, or refuel bridge 332 and can operator a tool delivery control module 336. The tool delivery control module 336 can include a display, a joystick, a steering wheel, a mouse, a keyboard, a voice input, or other type of operator input for receiving an input from an operator. The control module 336 generates control commands that are communicated to the tool delivery device 100. The tool delivery device 100 is placed into a pool 302, which as shown may be within the RPV 306, and is moved within the pool 302 in response to received commands. As understood to those skilled in the art, FIG. 3 is not necessarily to scale and, as such, the size of the tool delivery device 100 as compared to the RPV 306 or components thereof may vary in other embodiments or implementations.

In operation, the tool delivery device 100 is controlled to propel into the RPV 306 and down to a distance of D1 which is between the side wall 310 and the shroud 314, e.g., such that the guide assembly 104 is positioned within the annulus 320 containing the jet pump assemblies 326. The tool delivery device 100 is attached to the jet pump inlet and a tool 120, such as an inspection tool or probe 120, is inserted into the jet pump 406. The tool delivery device 100 is detached and moved to another jet pump 406 and the process is repeated until all of the jet pumps 406 within the RPV 306 have been inspected or had a tool 120 delivered as required. As is also apparent to those skilled in the art, the tool delivery device 100 can also be configured to deliver more than one tool or inspection device. For example, in additional to delivering a probe 120, a camera or other separate sensing element can also be inserted and controlled independently of the probe 120.

Figure 4:
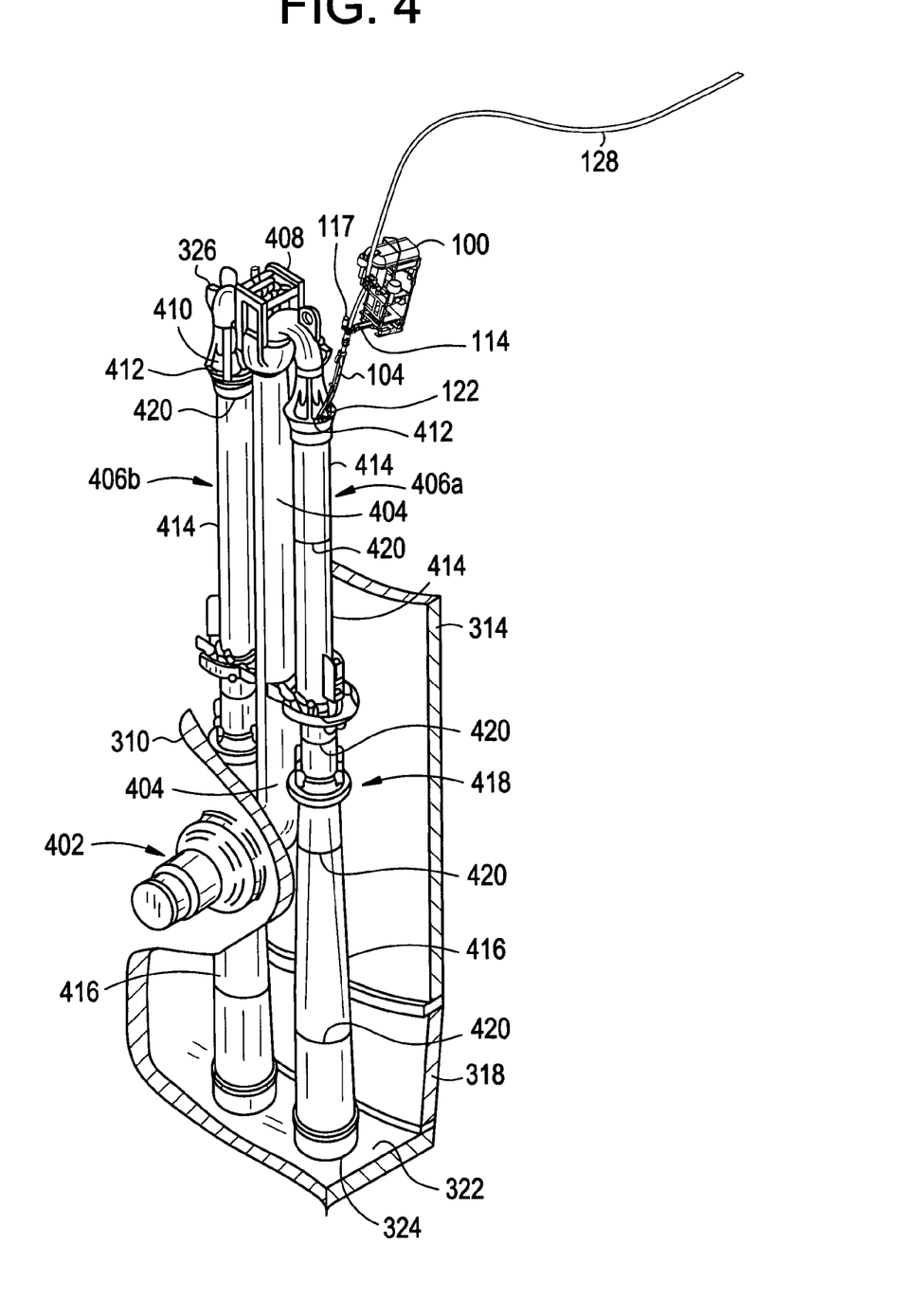
FIG. 4 is a sectional view of a tool delivery device coupled to an inlet of a submerged nuclear reactor jet pump according to another embodiment of the invention.

FIG. 4 is a perspective view, with parts cut away, of a jet pump assembly 326 with a coupled tool delivery device 100. As similar to noted above, FIG. 4 is not necessarily to scale and, as such, the size of the tool delivery device 100 as compared to the RPV 306, the jet pump 406, or components thereof may vary in other embodiments or implementations. For example, in one embodiment, the tool delivery device 100 is approximately one fourth the size of jet pump 406. An inlet nozzle 402 extends through side wall 310 of RPV 306 and is coupled to a jet pump assembly 326. The jet pump assembly 326 includes a riser pipe 404 that extends between and substantially parallel to shroud 314 and side wall 310. The riser pipe 404 is coupled to two jet pumps 406A and 406B by a transition assembly 408. Each jet pump 406 includes a jet pump nozzle 410, a suction inlet 412, an inlet mixer 414, and a diffuser 416. The jet pump nozzle 410 is positioned in suction inlet 412 that is located at a first end of inlet mixer 414. The diffuser 416 is coupled to a second end of inlet mixer 414 by a slip joint 418. Because of their large size, both inlet mixer 414 and diffuser 416 are formed from multiple cylindrical sections. Circumferential weld joints 420 join the cylindrical sections together.

As discussed above, the tool delivery device 100 is controlled by an operator or a control system or module 336 with one or more of the thrusters 108 moving the tool delivery device 100 within the pool 302 containing the jet pump assembly 326. The tool delivery device 100 is moved and positioned about the jet pump nozzle 410 of one of the jet pumps 406 (shown as jet pump 406A) such that the guide latch 122 is positioned to engage a lip or edge of the inlet 412, e.g., the edge of the inlet 412 is positioned in gap 207. Once so positioned, the guide latch 122 is activated to clamp or couple to the inlet 412 by activation of actuator 210. From this position, the inspection or other tool 120 can be inserted into the interior of jet pump 406 as described above and along the insertion path 212. Once jet pump 406A has had the tool delivered as required and the tool 120 has been withdrawn, the guide latch 122 releases attachment from the inlet 412 and the tool delivery device 100 is moved via remote control commands to a position about another jet pump inlet 412, such as for jet pump 406B.

After attachment to inlet 412, the tool delivery device 100 can be moved about gimbal 123, rotary coupling 115, and linear coupling 114, to position the submarine assembly 102 at or adjacent to shroud 314. In this manner, the tool delivery device 100 can obtain additional stabilization during continued operations such as the insertion and extraction of the tool 120. In other embodiments, the submarine assembly 102 can also include one or more actuators (not shown) that can enable the submarine assembly 102 to adjust to the various distances between the shroud 314 and the side wall 310 and between the submarine assembly 102 and the inlet 412. These can be in addition to rotary coupling 115 and linear coupling 114. For example, a ball actuator (not shown) can be positioned on either side of the submarine assembly 102. Each ball actuator can have two ball transfers, one above and one below the center of gravity of the submarine assembly 102. The ball transfers enable the submarine assembly 102 to translate vertically and horizontally along a walled surface such as shroud 314 without affecting the distance between the guide latch 122 and the wall. These ball actuators can also enable the operator or operational system to position the guide latch 122 in a position to couple to the inlet 412.

Figure 5:
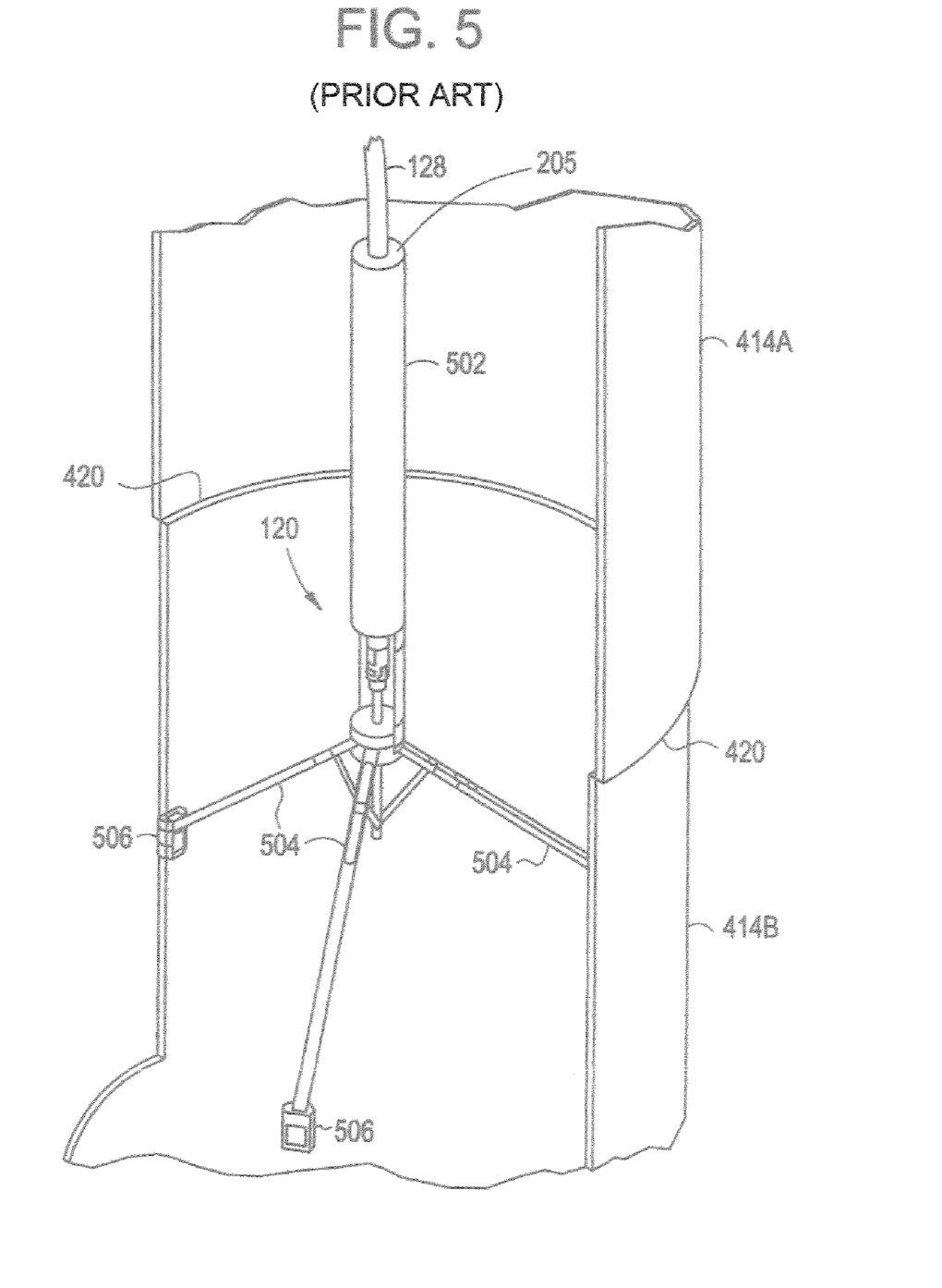
FIG. 5 is a perspective view of an inspection tool deployed within a sectional cut-away view of a submerged bore of a jet pump according to another exemplary embodiment of the invention.

Referring to FIG. 5, one embodiment of a tool 120 positioned within the jet pump inlet mixer 414. As shown, the tool 120 includes a body 502 which is suspended within a cylindrical inner portion of inlet mixer 414 via umbilical 128 that enters the tool 120 at a cavity 205. As noted above, the inlet mixer 414 is composed of two coupled sections 414A and 414B. The two sections 414A and 414B are coupled by a circumferential weld joint 420. The tool 120 includes, in this example, a plurality of arms 504 that extend outward from the body 502 and that have sensors 506 attached to the ends. The tool 120 moves vertically within the inlet mixer 414 to various positions to position the sensors 506 to detect one or more characteristics of the weld joints 420. Additionally, the inspection tool 120 can also include a rotational capability for rotating arms 504 and sensors 506 radially within inlet mixer 414. In this manner, the full circumferential weld 420 can be sensed or inspected by sensors 506. One or more operations of the inspection tool 120 can be controlled or supported by the tool delivery device 100 from which the tool 120 has been inserted within the inlet mixer 414.

The above descriptions of the tool delivery device 100 and the RPV 306 with submerged jet pumps 406 have been described. In operation, the tool delivery device 100 described herein can provide for signification improvements in the operational maintenance of submerged bores such as a nuclear reactor jet pump 406. The tool delivery device 100 can be placed into the pool containing a plurality of submerged bores to be inspected. For example, a nuclear power plant can contain a plurality of reactor pressure vessels 306, each having a plurality of jet pumps 406 for which the inner welds require inspection. In such a case, once the tool delivery device 100 is placed within the pool 302, an operator or operational system or module 336 can execute controls or commands to remotely maneuver the tool delivery device 100 in three dimensions with the pool so as to position the guide latch 122 of the tool delivery device 100 about jet pump inlet 412. Once the guide latch 122 is attached to the inlet 412, the operator or operational system can operate the tool delivery device 100 for inserting and controlling the operation of the inspection tool 120 within the jet pump 406. After the inspection is complete, the tool 120 is withdrawn back into the tool delivery device 100 and the guide latch 122 is decoupled from the inlet 412. The tool delivery device 100 is thereafter repositioned as necessary with the pool 302. Generally, only minimal additional manual manipulations of the tool delivery device 100 will be required until the removal of the tool delivery device 100 is desired or until all submerged bores have had the tool 120 delivered therein.

When describing elements or features of the present invention or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the invention. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes may be employed.

What is claimed is:

1. A method for delivery of a tool into a nuclear reactor jet pump submerged in a reactor pool, the method comprising:
    generating a plurality of command signals at a remotely located tool delivery device control module;
    positioning a tool delivery device having a submarine assembly adjacent an inlet of the jet pump within the reactor pool using at least one propulsion drive operably connected to the submarine assembly and responsive to at least one of the remotely generated command signals, the submarine assembly being interoperably coupled to a guide assembly via a linear coupling;
    maintaining a tool position controller of the submarine assembly in a substantially stable and constant location within the reactor pool adjacent the inlet of the jet pump utilizing a ballasted floatation assembly configured to provide stability to the submarine assembly;
    positioning a guide latch of the guide assembly in contact with the inlet of the jet pump, in response to at least one of the remotely generated command signals, utilizing the linear coupling to move the guide assembly relative to the substantially stable submarine assembly;
    coupling the guide latch to the inlet of the jet pump, in response to at least one of the remotely generated command signals; and
    inserting a tool from the tool delivery device through the guide assembly, the inlet, and into the jet pump using the tool position controller of the submarine assembly.

2. The method of claim 1, wherein generating the plurality of command signals comprises:
    generating the command signals at the remotely located tool delivery device control module; and
    transmitting the command signals to the tool delivery device via at least one communications link.

3. The method of claim 1, further comprising generating a video signal indicative of a position of the tool delivery device within the pool from a camera mounted on the tool delivery device and transmitting the video signal to a display device associated with the control module.

4. The method of claim 1, further comprising generating a position signal indicative of the position of the tool delivery device within the pool from a position sensor mounted on the tool delivery device and transmitting the position signal to a position monitor associated with the control module.

5. The method of claim 1, further comprising transmitting a position signal from a position sensor mounted on the tool delivery device to the control module, the position signal indicative of the position of the tool delivery device within the pool, generating a plurality of movement control commands as a function of the received position signal, and transmitting the movement control commands to the tool delivery device.

6. The method of claim 1, further comprising tracking the position of the inserted tool via position signals transmitted from a position sensor mounted on the tool to the control module.

7. The method of claim 1 wherein the tool is an inspection probe, and inserting the tool from the tool delivery device through the inlet and into the jet pump comprises activating and deactivating the inspection probe within the jet pump to inspect an internal surface of the jet pump.

8. The method of claim 1, further comprising controlling a position of the inserted tool within the jet pump using the tool position controller.

9. The method of claim 1, further comprising withdrawing the tool from the jet pump using the tool position controller.

10. The method of claim 1, further comprising decoupling the tool delivery device guide latch from the jet pump inlet, via at least one of the remotely generated command signals.

11. The method of claim 1, further comprising placing the tool delivery device into the reactor pool containing a plurality of jet pumps.

12. The method of claim 1 wherein the tool delivery device includes a plurality of propulsion drives for moving the tool delivery device in three dimensions within the pool.

13. The method of claim 1 wherein the tool delivery device includes a guide for inserting one or more tools through the inlet and into the jet pump, and wherein positioning the tool delivery device adjacent an inlet of the jet pump comprises compressively engaging a portion of the guide to an edge of the inlet to at least partially stabilize a position of the tool delivery device relative to the inlet and the jet pump.

14. The method of claim 1 wherein inserting a tool from the tool delivery device through the inlet comprises:
   delivering the tool through the inlet and into a cylindrically or conically shaped portion of the jet pump by controlling a support cable connected between the tool delivery device and the tool; and
   providing an umbilical line connected between the tool and the tool position controller for controlling an operation of the tool.

15. The method of claim 13, further including generating a video signal indicative of the position and operation of the guide about the inlet from a camera mounted on the tool delivery device and transmitting the video signal to a display device associated with the control module.

* * * * *

UNITED STATES PATENT AND TRADEMARK OFFICE
CERTIFICATE OF CORRECTION

PATENT NO. : 7,715,516 B2
APPLICATION NO. : 11/103931
DATED : May 11, 2010
INVENTOR(S) : Jarred Smith et al.

It is certified that error appears in the above-identified patent and that said Letters Patent is hereby corrected as shown below:

Col. 5, line 13, should read:

As shown the bore insertion assembly 118 can include a guide latch 122 configured for coupling to a bore or an inlet to a bore in which a tool 120 is to be delivered. The guide latch 122 can include a clamping or engaging mechanism as will be discussed in further detail with regard to FIGS. 1 and 2. The bore insertion assembly 118 can be coupled to the other portions of the tool guide 116 by means of a flexible joint or gimbal 123. Such gimbal 123 may be located at any position along the length of guide assembly 104 and is shown in Fig. 1, by way of example, as being at the top.

Signed and Sealed this
Twenty-fourth Day of May, 2011

David J. Kappos
*Director of the United States Patent and Trademark Office*